Reissued June 6, 1950

Re. 23,239

UNITED STATES PATENT OFFICE 23,239

INHIBITOR FOR GASOLINE

Robert H. Rosenwald, Western Springs, and Joseph A. Chenicek, Bensenville, Ill., assignors to Universal Oil Products Company, Chicago, Ill., a corporation of Delaware No Drawing. Original No. 2,310,710, dated February 9, 1943, Serial No. 295,476, September 18, 1939. Application for reissue December 7, 1948, Serial No. 64,028

19 Claims. (Cl. 44—78)

Matter enclosed in heavy brackets [ ] appears in the original patent but forms no part of this reissue specification; matter printed in italics indicates the additions made by reissue

This invention relates to a method for stabilizing olefin-containing hydrocarbon oils, and more particularly, cracked gasolines of the petroleum origin. However, gasolines from other sources, such as coal tar, shale oil, etc., may be also treated according to the present invention, as may those made by polymerization of olefins, reforming of naphthas, etc.

More specifically, the invention concerns a method for stabilizing olefin-containing gasolines during storage in respect to their valuable properties such as color and anti-knock value and low gum content which tend to depreciate because of the action of oxygen upon the olefins in said gasolines.

The cracking and reforming processes which are employed to produce additional yields of gasoline from heavy hydrocarbonaceous oils, or to increase the anti-knock properties of naphthas and straight run gasolines, produce motor fuels having substantial concentrations of unsaturated hydrocarbons, particularly mono-olefins and di-olefins. These olefinic hydrocarbons tend to form peroxides and gums when stored in the presence of oxygen. The use of inhibitors to prevent such reactions has been practiced, and many types of compounds have been suggested for this purpose, including aminophenols, wood tar fractions, polyhydroxy phenols, etc.

In one specific embodiment, the present invention comprises the treatment of unstable olefin-containing gasolines to preserve their valuable properties in respect to gum content, color and anti-knock value by adding thereto minor quantities of 2-alkyl-4-alkoxyphenols of the general structure

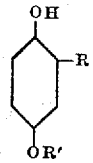

wherein R comprises any alkyl group and OR' is an alkoxy group wherein R' is of the same or different molecular weight and structure than R.

The properties desirable in a gasoline gum inhibitor are as follows:

a. Solubility in the gasoline to a degree in excess of the maximum concentration in which it is likely to be used.

b. High degree of potency so that relatively small concentrations can be used.

c. Insolubility or relatively low solubility in water or aqueous alkaline or acidic solutions with which the gasoline is likely to come in contact.

d. Either normally liquid or having a high degree of solubility in a non-aqueous, gasoline-miscible solvent thus increasing the ease of handling and addition to the gasoline.

e. Non-reactive with tanks, fittings, lines, engine parts, etc., with which the gasoline is likely to come in contact.

f. Of light color, and imparting or developing no objectionable color or odor to the gasoline when added, or during storage.

The inhibitors of the present invention to a large extent fulfil these requirements.

The degree of insolubility of an inhibitor in water or caustic solutions is of particular importance since gasoline storage tanks generally contain water which is alkaline in reaction. If the inhibitor is soluble in the water layer, it is partially removed from the gasoline and thus its effect is greatly reduced. The present type of compound has been found to be practically insoluble in water and in most cases to be but slightly removable from gasoline by contact with dilute alkaline solutions.

The compounds of the present invention are useful for preventing the deterioration of gasoline, but different individual compounds of the same type are not necessarily exact equivalents.

The alkyl groups substituted in the ring may comprise any alkyl group such as methyl, ethyl, propyl, isopropyl, butyl, isobutyl, secondary butyl, t-butyl, amyl, isoamyl, secondary amyl, etc. Of these groups the t-alkyl groups appear to be more effective in contributing to the inhibitor potency of the resultant compound than do those groups of lower molecular weight, for example methyl and ethyl groups. Likewise, the groups of higher molecular weight contribute to other desirable properties of the inhibitor such as decreasing the solubility of the resulting compound in aqueous solutions. The substituent group is preferably in the position ortho to the hydroxyl group.

Some compounds having alkyl groups in the meta position may also have inhibiting value.

We have found that when the alkoxy or ether group is in the 4-position, compounds having greater inhibitor potency are available than when this group is in any other position in the substituted phenol. The alkyl group of this alkoxy substituent may comprise for example ethyl, methyl, propyl, isopropyl, butyl, isobutyl, secondary butyl, t-butyl, amyl, isoamyl, secondary amyl, t-amyl, etc. groups. Of these, the groups of relatively low molecular weight, comprising methyl or ethyl groups appear to have the strongest influence, although other groups have considerable value. Straight-chain alkyl substituents of greater length than two carbon atoms tend to produce inhibitors of lower potencies than when methyl or ethyl groups are substituted.

An example of the improved effectiveness of the present type of inhibitor is illustrated as follows:

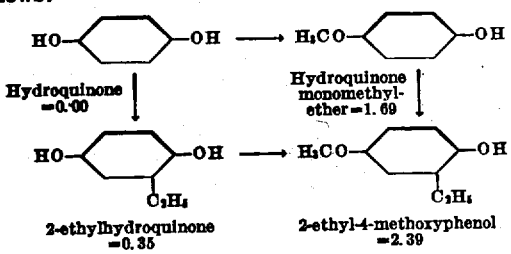

In this case, the inhibitor potencies of the various compounds listed as given by the numerical values, were measured by means of the oxygen bomb induction period test, and the inhibitor potencies are reported as "inhibitor ratio." The inhibitor ratio is defined as the ratio of the increase in induction period of a given gasoline by a given percentage of unknown inhibitor to the induction period increase with a like quantity of a standard commercial gum inhibitor. Thus the values as reported are direct ratios of inhibitor potency as compared with a widely used commercial gum inhibitor. From the illustration it will be noted that hydroquinone and ethylhydroquinone have little or no inhibitor value compared with the commercial inhibitor. The monomethyl ether of hydroquinone has a considerable potency, being 1.69 times as effective as the commercial inhibitor. The substitution of an ethyl group in the position ortho to the hydroxyl group (2-ethyl-4-methoxyphenol) increases the inhibitor ratio to an even greater extent, so that the resulting 2-ethyl-4-methoxyphenol is 2.39 times as effective as the commercial inhibitor.

The alkyl substituents may be introduced into the aromatic nucleus in a number of ways. One of these consists in alkylating a hydroquinone ether by contacting it at a temperature of 75–80° C. with the alcohol corresponding to the group to be substituted, using 85% phosphoric acid as the catalyst. The reaction mixture is stirred continuously until the reaction is complete. The mixture is then washed with water to remove remaining acid and is extracted with 10% sodium hydroxide solution to remove the unreacted hydroquinone ether. The insoluble portion is distilled under reduced pressure and the resulting compound may be further purified by recrystallization.

The term "stabilizing" gasoline as used herein is intended to mean the prevention of deterioration of the gasoline in-so-far as its desirable properties of storage stability, color, anti-knock value, etc., are concerned.

The following example still further illustrates the benefits and usefulness of the present type of inhibitor. This example is given to demonstrate the usefulness and practicability of our invention, but should not be construed as limiting it to the exact compounds illustrated therein. As in the foregoing, the inhibiting value in-so-far as the stabilization of gasoline is concerned is reported in terms of inhibitor ratio compared with a commercially used gum inhibitor.

In the following table are shown a number of representative compounds of the present invention together with their inhibitor ratios:

TABLE I

INHIBITOR RATIOS OF 2-ALKYL-4-ALKOXYPHENOLS IN 0.05% CONCENTRATION

| Compound | Structural Formula | Inhibitor Ratio |
|---|---|---|
| Commercial inhibitor | | 1.0 |
| 2-ethyl-4-methoxyphenol | 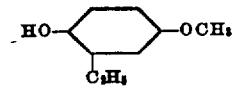 | 2.39 |
| 2-ethyl-4-ethoxyphenol | 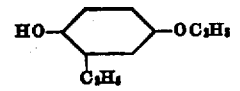 | 2.38 |
| 2-alkyl-4-methoxyphenol | 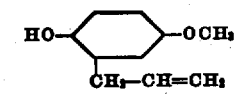 | 2.19 |
| 2-propyl-4-methoxyphenol | 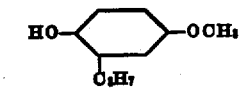 | 2.30 |
| 2-tert-butyl-4-methoxyphenol | 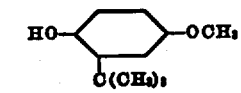 | 2.78 |

INHIBITOR RATIOS OF 2-ALKYL-4-ALKOXYPHENOLS IN 0.05% CONCENTRATION—Continued

| Compound | Structural Formula | Inhibitor Ratio |
|---|---|---|
| 2-tert-butyl-4-ethoxyphenol | 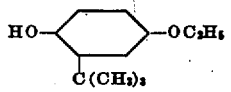 | 4.40 |
| 2-tert-butyl-4-isopropoxyphenol | 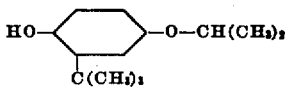 | 2.85 |
| 2-tert-butyl-4-isobutoxyphenol | 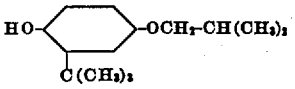 | 2.78 |
| 2-t-amyl-4-methoxyphenol | 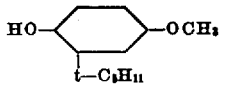 | 3.10 |

The results show that the compounds listed are specially effective inhibitors as compared to a commercial gum inhibitor when used in equal weights. They are not, however, exactly equivalent since the specific effects of different groups in the alkoxy or in the ortho ring substituted positions may be quite different. Thus it will be seen that an ethyl or methyl group in the alkoxy group is more effective than other alkyl groups tried. On the other hand, the substitution of a t-butyl group in the aromatic ring greatly increases the inhibitor potency of the resultant compound.

The effectiveness is further illustrated by the data presented in Table II.

TABLE II

| Inhibitor | MgCu Dish Gum | | | Oxygen Bomb Induction Period | | | Per Cent Removed by— | |
|---|---|---|---|---|---|---|---|---|
| | Orig. | Water Wash | Caustic Wash | Orig. | Water Wash | Caustic Wash | Water Wash | Caustic Wash |
| Blank gasoline | 127 | 138 | 134 | 90 | 80 | 75 | | |
| Commercial inhibitor | 4 | 24 | 180 | 310 | 260 | 100 | 18 | 89 |
| 2-tert-butyl-4-methoxyphenol | 8 | 7 | 9 | 305 | 310 | 295 | 0 | 0 |
| 2-tert-butyl-4-ethoxyphenol | 7 | 9 | 10 | 310 | 335 | 330 | 0 | 0 |
| 2-tert-butyl-4-isopropoxyphenol | 15 | 15 | 17 | 290 | 295 | 280 | 0 | 0 |
| 2-tert-butyl-4-isobutoxyphenol | 16 | 24 | 19 | 310 | 300 | 295 | 0 | 0 |
| 2-ethyl-4-methoxyphenol | 37 | 64 | 19 | 300 | 300 | 145 | 0 | 67 |
| 2-ethyl-4-ethoxyphenol | 13 | 19 | 28 | 290 | 300 | 180 | 0 | 47 |
| Hydroquinone monoethyl ether | 32 | 38 | 104 | 310 | 280 | 100 | 9 | 89 |
| Hydroquinone mono-isopropyl ether | 27 | 44 | 115 | 280 | 270 | 90 | 0 | 92 |

The inhibitor potency as measured by the oxygen bomb induction period and copper dish gum both before and after washing the inhibited gasoline with water and 5% by volume of 1% sodium hydroxide solution is illustrated. In this case the gasoline was inhibited with a sufficient quantity of each inhibitor to produce approximately the same induction period. Hydroquinone monoethylether and monoiso-propylether are included in the list for purposes of comparison. The percentage of inhibitor removed by water or caustic is calculated from the per cent decrease in induction period after the sample has been washed with water or with caustic solution. It will be noted that the compounds of the present invention are less soluble in water than the commercial inhibitor or hydroquinone monoethylether. Moreover, these compounds are less soluble in dilute caustic solution than the monoalkylethers or the commercial gum inhibitor. It will be noted also that the t-butyl group as the ring substituent reduces the alkali solubility of the compounds to a greater extent than does an ethyl group in the same position. It will also be observed that the compounds of the present invention have practically no detrimental effect on the color or color stability of the gasoline when added in these quantities. In all cases, the color of the resulting gasoline was equal to or better than that of the gasoline inhibited with a commercial inhibitor.

It has been our observation in the laboratory that the inhibitors of this invention are comparatively stable insofar as color is concerned when exposed to air. One of the disadvantages of many commercial inhibitors is that they develop color rapidly when exposed to air. The stable character of the present inhibitors may therefore be considered an advantage.

We claim as our invention:

1. A process for stabilizing olefin-containing hydrocarbon oils in regard to their desirable properties which comprises adding to said oils a minor portion of a compound having the general structure

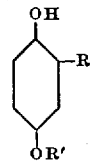

wherein R and R′ are alkyl groups.

2. A process for stabilizing olefin-containing gasoline in regard to its valuable properties which comprises adding to said gasoline a minor portion of a compound having the general structure

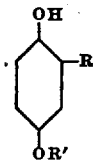

wherein R and R′ comprise alkyl groups.

3. A process for stabilizing cracked gasoline against deterioration of its valuable properties which comprises adding to said gasoline a minor portion of a compound of the following general formula:

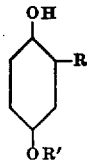

wherein R is a t-alkyl group and R′ is an alkyl group.

4. A process for stabilizing olefin-containing gasoline against deterioration of its valuable properties which comprises adding to said gasoline a minor portion of a compound of the following general formula:

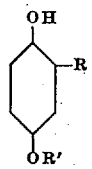

wherein R is a t-butyl group and R′ is an alkyl group.

5. A process for stabilizing olefin-containing gasoline against deterioration of its valuable properties which comprises adding to said gasoline a minor portion of a compound of the following general formula:

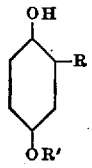

wherein R and R′ are t-alkyl groups.

6. A process for stabilizing olefin-containing gasoline against deterioration of its valuable properties which comprises adding to said gasoline a minor portion of a 2-alkyl-4-alkoxyphenol.

[7. An inhibitor for cracked gasoline which comprises essentially a compound having the general formula:

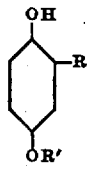

wherein R and R′ are alkyl groups.]

[8. An inhibitor for olefin-containing gasoline which comprises essentially a compound having the general formula:

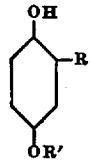

wherein R is an alkyl group and R′ is different alkyl group.]

9. An inhibitor [for olefin-containing gasoline] which comprises essentially a compound having the general formula:

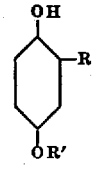

wherein R comprises a t-alkyl group and R′ an alkyl group *having a smaller number of carbon atoms than said t-alkyl group.*

10. An inhibitor for olefin-containing gasoline which comprises essentially a compound having the general formula:

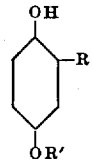

wherein R is a t-butyl and R′ is an alkyl group.

11. An inhibitor for olefin-containing gasoline which comprises essentially a compound having the general formula:

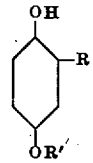

wherein R and R′ are t-alkyl groups.

[12. An inhibitor for olefin-containing gasoline which comprises essentially a compound having the general formula:

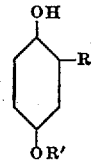

wherein R is an alkyl group and R′ is a t-alkyl group.]

13. An inhibitor for olefin-containing gasoline which comprises essentially a compound having the general formula:

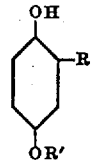

wherein R is a t-alkyl group and R′ is a t-butyl group.

14. Motor fuel comprising olefinic gasoline and a relatively small amount of a 2-alkyl-4-alkoxyphenol.

15. Motor fuel comprising olefinic gasoline and a relatively small amount of a 2-t-alkyl-4-alkoxyphenol.

16. Motor fuel comprising olefinic gasoline and a relatively small amount of a compound having the general formula:

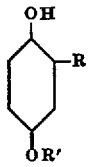

wherein R is an alkyl group of at least 3 carbon atoms and R′ is an alkyl group of less than 3 carbon atoms.

[17. An inhibitor comprising a 2-alkyl-4-alkoxyphenol.]

[18. An inhibitor comprising a compound having the general formula

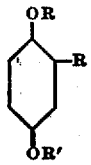

wherein R is an alkyl group of at least 3 carbon atoms and R′ is an alkyl group of less than 3 carbon atoms.]

*19. An inhibitor comprising a 2-tertiaryalkyl-4-alkoxyphenol.*

*20. An inhibitor comprising 2-tertiarybutyl-4-methoxyphenol.*

*21. An inhibitor comprising 2-tertiarybutyl-4-ethoxyphenol.*

*22. An inhibitor comprising a compound having the general formula:*

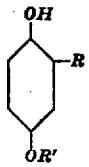

*wherein R is a tertiaryalkyl group and R′ is an alkyl group of less than 3 carbon atoms.*

*23. An inhibitor comprising a 2-tertiaryalkyl-4-alkoxyphenol in which the alkyl and alkoxy groups each contain not more than 5 carbon atoms.*

*24. An inhibitor comprising a compound having the general formula:*

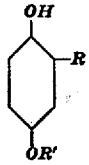

*wherein R is a tertiaryalkyl group of not more than 5 carbon atoms and R′ is an alkyl group of less than 3 carbon atoms.*

ROBERT H. ROSENWALD.
JOSEPH A. CHENICEK.

REFERENCES CITED

The following references are of record in the file of this patent or the original patent:

UNITED STATES PATENTS

| Number | Name | Date |
|---|---|---|
| 1,884,559 | Calcott et al. | Oct. 25, 1932 |
| 1,942,827 | Mills et al. | Jan. 9, 1934 |
| 1,987,228 | Bruson | Jan. 8, 1935 |

OTHER REFERENCES

Beilstein: Organische Chemie, 4th ed., Erstes Erganzungswerk, vol. VI, pages 428 and 429 (1931).